(12) United States Patent
Harshith

(10) Patent No.: US 11,770,454 B2
(45) Date of Patent: Sep. 26, 2023

(54) NATIVE APPLICATION INTEGRATION FOR ENHANCED REMOTE DESKTOP EXPERIENCES

(71) Applicant: Citrix Systems, Inc., Fort Lauderdale, FL (US)

(72) Inventor: Katta Rajasekhar Sreenivas Harshith, Andhra Pradesh (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 82 days.

(21) Appl. No.: 17/120,543

(22) Filed: Dec. 14, 2020

(65) Prior Publication Data

US 2022/0191288 A1     Jun. 16, 2022

(51) Int. Cl.
| | |
|---|---|
| *H04L 29/08* | (2006.01) |
| *G06F 9/451* | (2018.01) |
| *G06F 21/62* | (2013.01) |
| *H04L 29/06* | (2006.01) |
| *H04L 67/141* | (2022.01) |
| *H04L 67/75* | (2022.01) |
| *H04L 9/40* | (2022.01) |
| *H04L 67/06* | (2022.01) |

(52) U.S. Cl.
CPC ............ *H04L 67/141* (2013.01); *G06F 9/452* (2018.02); *G06F 21/6218* (2013.01); *H04L 63/0876* (2013.01); *H04L 67/06* (2013.01); *H04L 67/75* (2022.05)

(58) Field of Classification Search
CPC ....... H04L 67/141; H04L 67/75; H04L 67/06; H04L 63/08; H04L 63/0876; G06F 9/452; G06F 21/6218

USPC ............................................................ 726/6
See application file for complete search history.

(56) References Cited

U.S. PATENT DOCUMENTS

| | | | | |
|---|---|---|---|---|
| 8,407,768 | B1 * | 3/2013 | Hayter | H04L 63/0853 726/5 |
| 8,407,773 | B1 * | 3/2013 | Hayter | H04L 67/51 726/7 |
| 8,965,958 | B2 * | 2/2015 | Myerscough | H04L 67/06 709/217 |
| 9,058,485 | B1 * | 6/2015 | Manmohan | G06F 21/554 |
| 2005/0138211 | A1 * | 6/2005 | Cheng | H04L 9/40 709/250 |
| 2010/0287219 | A1 * | 11/2010 | Caso | G06F 16/134 717/176 |
| 2012/0151373 | A1 * | 6/2012 | Kominac | H04L 67/141 715/740 |
| 2013/0013560 | A1 * | 1/2013 | Goldberg | G06F 16/178 707/634 |

(Continued)

FOREIGN PATENT DOCUMENTS

WO     WO-2015026936 A1 *   2/2015  ........... G06F 16/178

OTHER PUBLICATIONS

Feb. 8, 2022 International Search Report PCT/US2021072266.

*Primary Examiner* — Ruolei Zong

(57) ABSTRACT

Methods and systems for enhancing remote desktop experiences are described herein. A computing device may launch a remote desktop session. During the remote desktop session, the computing device may receive user input requesting a file to be launched at the computing device using a native application. The computing device may receive, from a remote desktop server, the file. Using a local application, the computing device may launch the file.

18 Claims, 12 Drawing Sheets

(56) References Cited

U.S. PATENT DOCUMENTS

| | | | |
|---|---|---|---|
| 2015/0121549 A1* | 4/2015 | Baessler | G06F 21/62 |
| | | | 726/28 |
| 2015/0269201 A1* | 9/2015 | Caso | H04L 67/1095 |
| | | | 707/641 |
| 2016/0364201 A1* | 12/2016 | Beveridge | G06F 9/452 |
| 2019/0334914 A1* | 10/2019 | Dotan | H04L 67/1095 |
| 2021/0141893 A1* | 5/2021 | Soman | G06F 21/53 |

* cited by examiner

NATIVE APPLICATION INTEGRATION FOR ENHANCED REMOTE DESKTOP EXPERIENCES

FIELD

Aspects described herein generally relate to computer networking, remote computer access, virtualization, enterprise mobility management, and hardware and software related thereto. More specifically, one or more aspects described herein provide systems and methods for enhancing remote desktop experiences using native applications.

BACKGROUND

Enterprise organizations are increasingly utilizing remote desktops to permit employees to access an enterprise network without being physically present at a location corresponding to the enterprise network. In some instances, however, certain applications, when operating within a remote desktop, may offer a disruptive user experience (e.g., when compared to use of those same applications on a local machine). As remote desktops are more frequently adopted and used, it is increasingly important to improve the corresponding user experience for various applications, so as to derive the maximum benefit from remote desktops.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards enhancing remote desktop experiences using native applications.

In one or more embodiments of the disclosure described herein, a computing device having at least one processor and memory storing computer-readable instructions that, when executed by the at least one processor, may cause the computing device to launch a remote desktop session. During the remote desktop session, the computing device may receive user input requesting a file to be launched at the computing device using a local application. The computing device may receive, from a remote desktop server, the file, and may launch, using a local application, the file.

In one or more instances, the remote desktop session may be launched based on verification of client credentials. In one or more instances, the computing device may send, along with a request to establish the remote desktop session, client security information indicating one or more security parameters corresponding to the computing device, wherein the remote desktop server is configured to select an access method for the file based on the client security information.

In one or more instances, the access method may include one of: 1) receiving, by the computing device and from the remote desktop server, the file, or 2) mapping, by the remote desktop server and to the computing device, a directory corresponding to the file. In one or more instances, the computing device may receive edits to the file. Based on the access method, the computing device may select a file save method. Using the file save method, the computing device may save the edits to the file. After saving the edits to the file, the computing device may exit the file.

In one or more instances, the file save method may include one of: 1) sending, to the remote desktop server, the edited file, where the edited file is deleted from the computing device after being sent, or 2) storing the edited file at a directory mapped to the remote desktop server. In one or more instances, the file may be received, at the computing device and from the remote desktop server, and may launch the file within a secure sandbox at the computing device.

In one or more instances, the computing device may launch the file by accessing a file directory, corresponding to the file, mapped to the computing device. In one or more instances, the remote desktop server may be configured to identify access parameters for the file, and the access parameters may indicate that the file may be edited at the computing device, or the file may be locked for editing at the computing device. In one or more instances, the computing device may identify local applications configured to launch the file, and may prompt for a user selection of one of the identified local applications.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
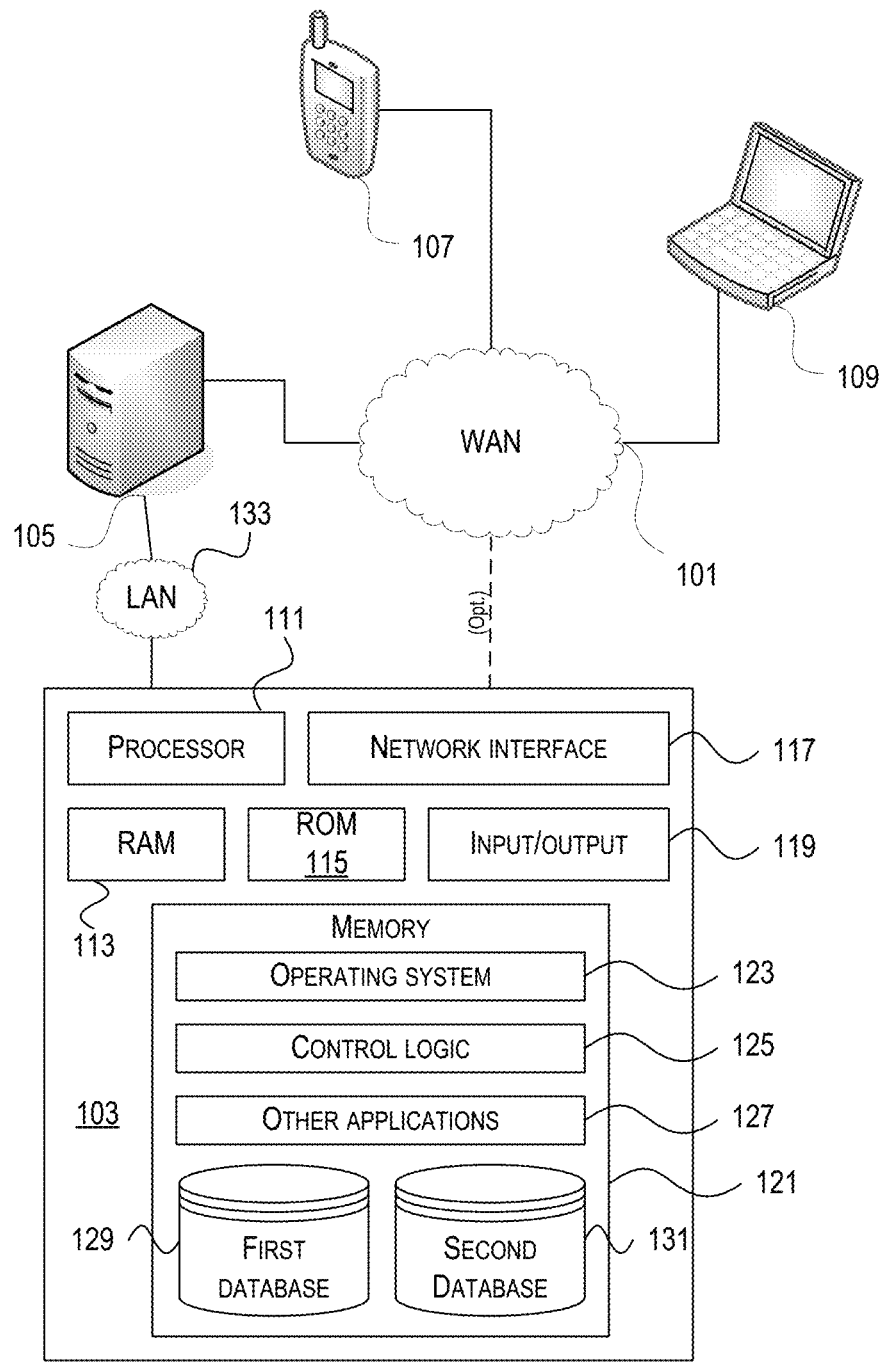
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards enhancing remote desktop experiences using native applications. For example, in some instances, native applications may provide a better user experience than virtual applications. For example, a user working on a document within a virtual desktop may discover that a word processing application installed at a client provides a good experience with ergonomic controls and ease of use. In some instances, this experience may be applicable to all tasks the user performs in the remote desktop (e.g., editing a document, viewing a PDF, playing audio or video, preparing a slideshow presentation, working on a spreadsheet, editing images, editing compressed files, and/or other operations that the client has applications to support).

To provide such an enhanced experience, within a remote desktop, the user may right click on a file and a context menu action may be displayed indicating "launch in client." When the user clicks on that menu item, the file may open within a client using a locally installed application. If there are multiple applications installed, the user may be shown an application chooser, which may be used to select a particular application. Once the user is done working on the file, the user may close the local application, and changes may be saved automatically to the remote desktop.

These features may be integrated into virtual applications and desktops. For example, the server side may include a virtual driver that may handle interactions on the server side and workspace clients (e.g., Android, MAC, IOS, Windows, Chromebooks, Linux, and/or other workspace clients) may have a client side virtual driver that may take care of interactions with the server side virtual driver. Implementing such features may improve client-side integrations and new features available at the client side may be included. For example, user experience may be improved due to ergonomics of native applications. Similarly, server loads may be reduced through the use of native applications, and likewise, maintenance costs on cloud resources may be reduced.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
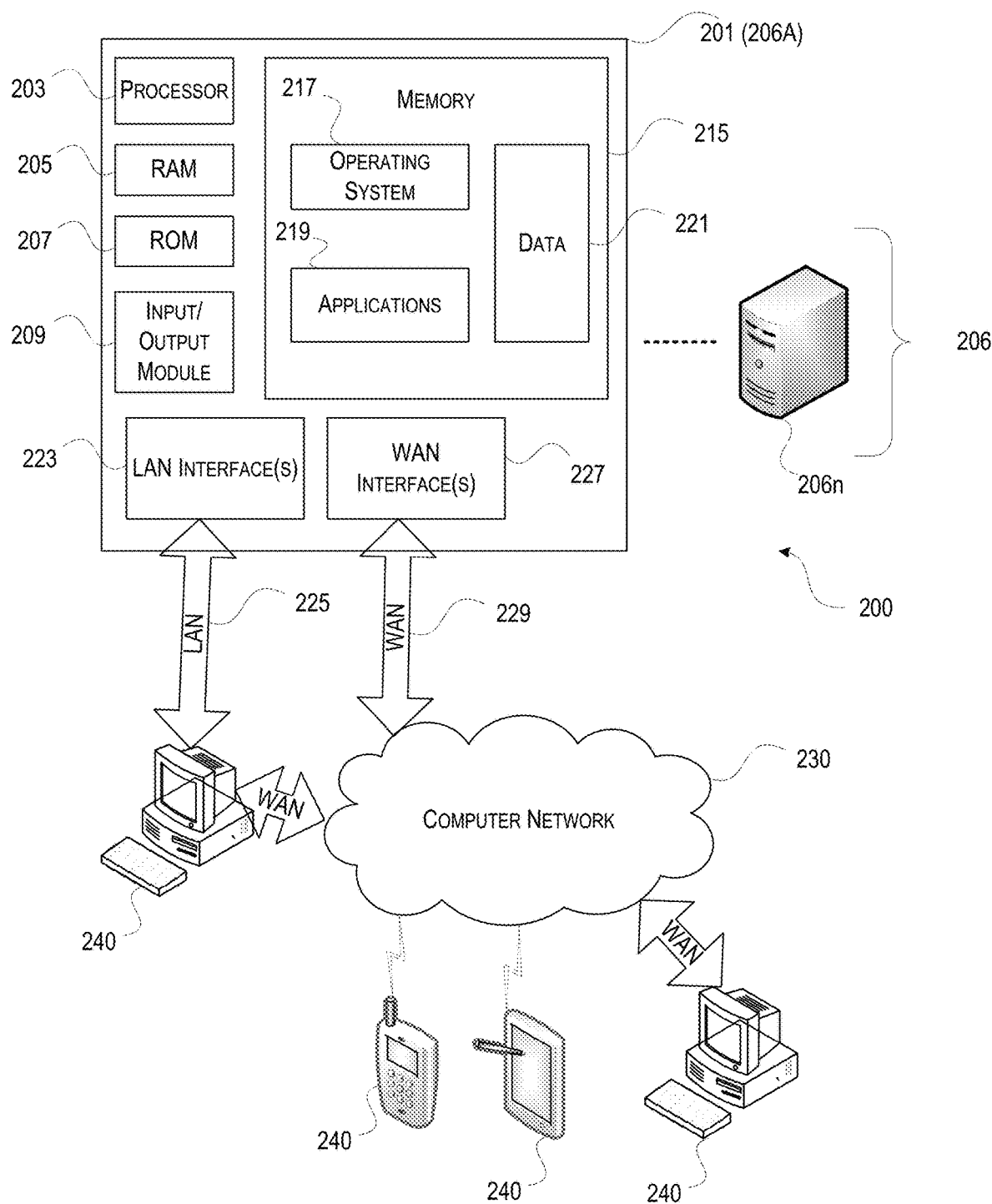
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
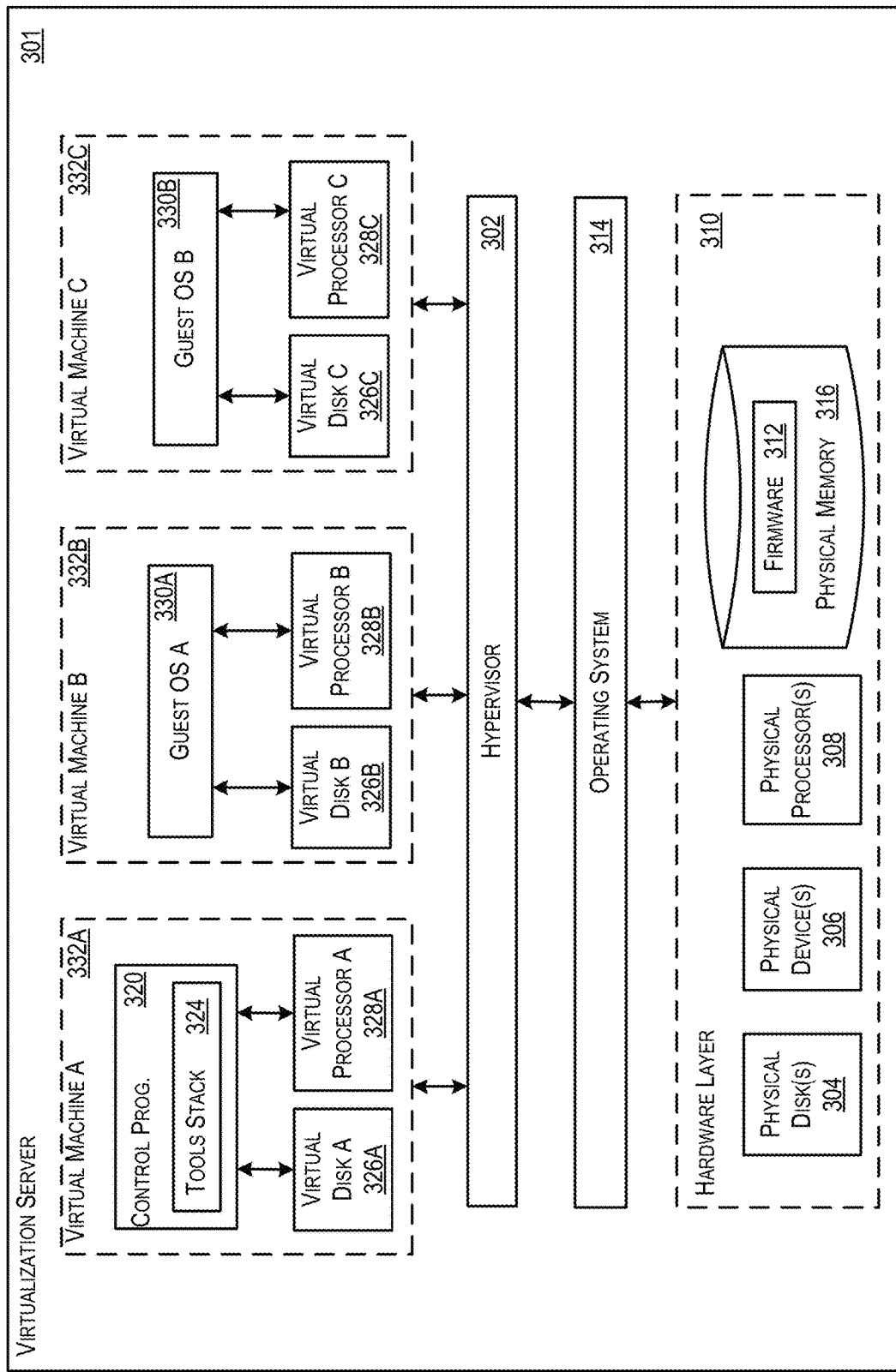
FIG. 3 depicts an illustrative virtualized system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the Citrix Hypervisor provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
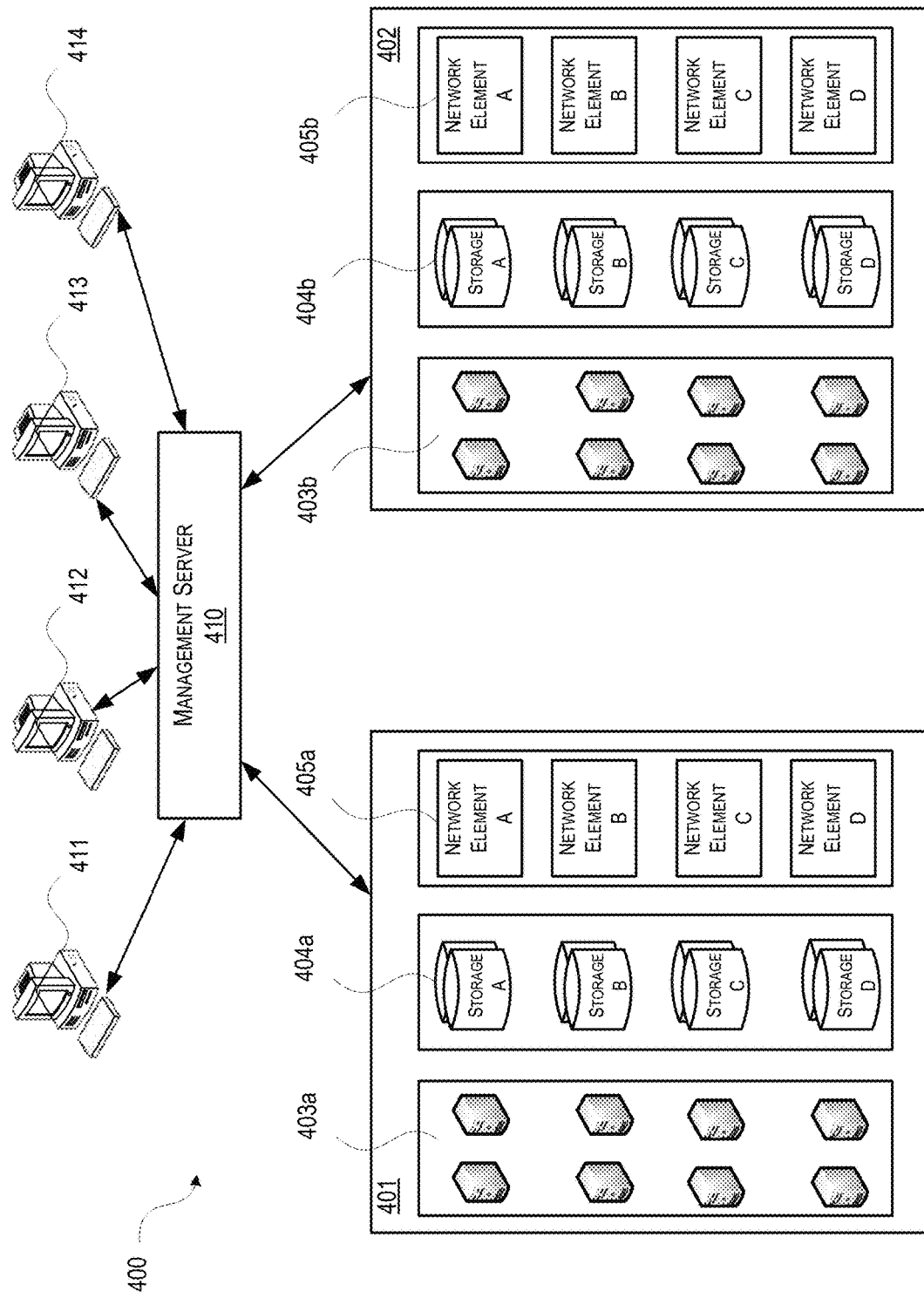
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, Citrix Cloud by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
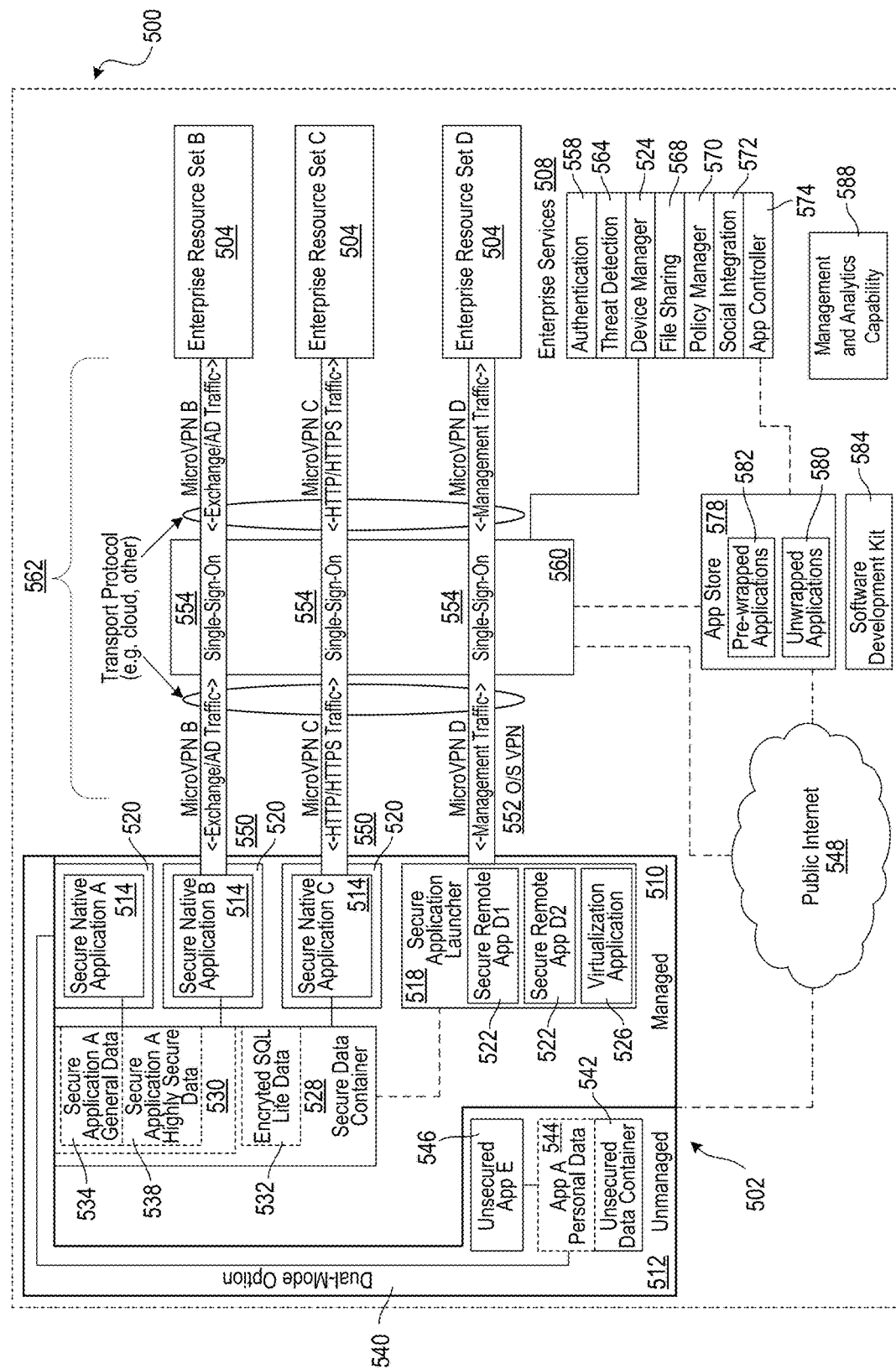
FIG. 5 depicts an illustrative enterprise mobility management system.

FIG. 5 represents an enterprise mobility technical architecture 500 for use in a "Bring Your Own Device" (BYOD) environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device 502 may run an iOS operating system, an Android operating system, or the like. The enterprise may choose to implement policies to manage the mobile device 502. The policies may be implemented through a firewall or gateway in such a way that the mobile device 502 may be identified, secured or security verified, and provided selective or full access to the enterprise resources (e.g., 504 and 508.) The policies may be mobile device management policies, mobile application management policies, mobile data management policies, or some combination of mobile device, application, and data management policies. A mobile device 502 that is managed through the application of mobile device management policies may be referred to as an enrolled device.

In some embodiments, the operating system of the mobile device 502 may be separated into a managed partition 510 and an unmanaged partition 512. The managed partition 510 may have policies applied to it to secure the applications running on and data stored in the managed partition 510. The applications running on the managed partition 510 may be secure applications. In other embodiments, all applications may execute in accordance with a set of one or more policy files received separate from the application, and which define one or more security parameters, features, resource restrictions, and/or other access controls that are enforced by the mobile device management system when that application is executing on the mobile device 502. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is not accessible by unmanaged applications and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application 514 is executed on the mobile device 502. The secure application wrapper 520 may include meta-data that points the secure native application 514 running on the mobile device 502 to the resources hosted at the enterprise (e.g., 504 and 508) that the secure native application 514 may require to complete the task requested upon execution of the secure native application 514. The secure remote applications 522 executed by a secure application launcher 518 may be executed within the secure application launcher 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application 526 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on the mobile device 502, this arrangement may also be elected for certain applications. For example, while some applications may be secured for use on the mobile device 502, others might not be prepared or appropriate for deployment on the mobile device 502 so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device 502 so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device 502 as well as a virtualization application 526 to allow access to applications that are deemed more properly operated on the server side. In an embodiment, the virtualization application 526 may store some data, files, etc. on the mobile device 502 in one of the secure storage locations. An enterprise, for example, may elect to allow certain information to be stored on the mobile device 502 while not permitting other information.

In connection with the virtualization application 526, as described herein, the mobile device 502 may have a virtualization application 526 that is designed to present GUIs and then record user interactions with the GUI. The virtualization application 526 may communicate the user interactions to the server side to be used by the server side application as user interactions with the application. In response, the application on the server side may transmit back to the mobile device 502 a new GUI. For example, the new GUI may be a static page, a dynamic page, an animation, or the like, thereby providing access to remotely located resources.

The secure applications 514 may access data stored in a secure data container 528 in the managed partition 510 of the mobile device 502. The data secured in the secure data container may be accessed by the secure native applications 514, secure remote applications 522 executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the mobile device 502 upon receipt of a command from the device manager 524. The secure applications (e.g., 514, 522, and 526) may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 546 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device 502 selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 502 may connect to enterprise resources 504 and enterprise services 508 at an enterprise, to the public Internet 548, and the like. The mobile device 502 may connect to enterprise resources 504 and enterprise services 508 through virtual private network connections. The virtual private network connections, also referred to as microVPN or application-specific VPN, may be specific to particular applications (as illustrated by microVPNs 550, particular devices, particular secured areas on the mobile device (as illustrated by O/S VPN 552), and the like. For example, each of the wrapped applications in the secured area of the mobile device 502 may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway 560 may also re-route traffic from the mobile device 502 to the public Internet 548, enabling the mobile device 502 to access publicly available and unsecured applications that run on the public Internet 548. The mobile device 502 may connect to the access gateway via a transport network 562. The transport network 562 may use one or more transport protocols and may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud-based resources, and the like. The enterprise resources 504 may be accessed by the mobile device 502 directly or through the access gateway 560. The enterprise resources 504 may be accessed by the mobile device 502 via the transport network 562.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services, and the like. Authentication services 558 may use certificates. The certificates may be stored on the mobile device 502, by the enterprise resources 504, and the like. The certificates stored on the mobile device 502 may be stored in an encrypted location on the mobile device 502, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store 578 may be provided with an intuitive and easy to use user interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
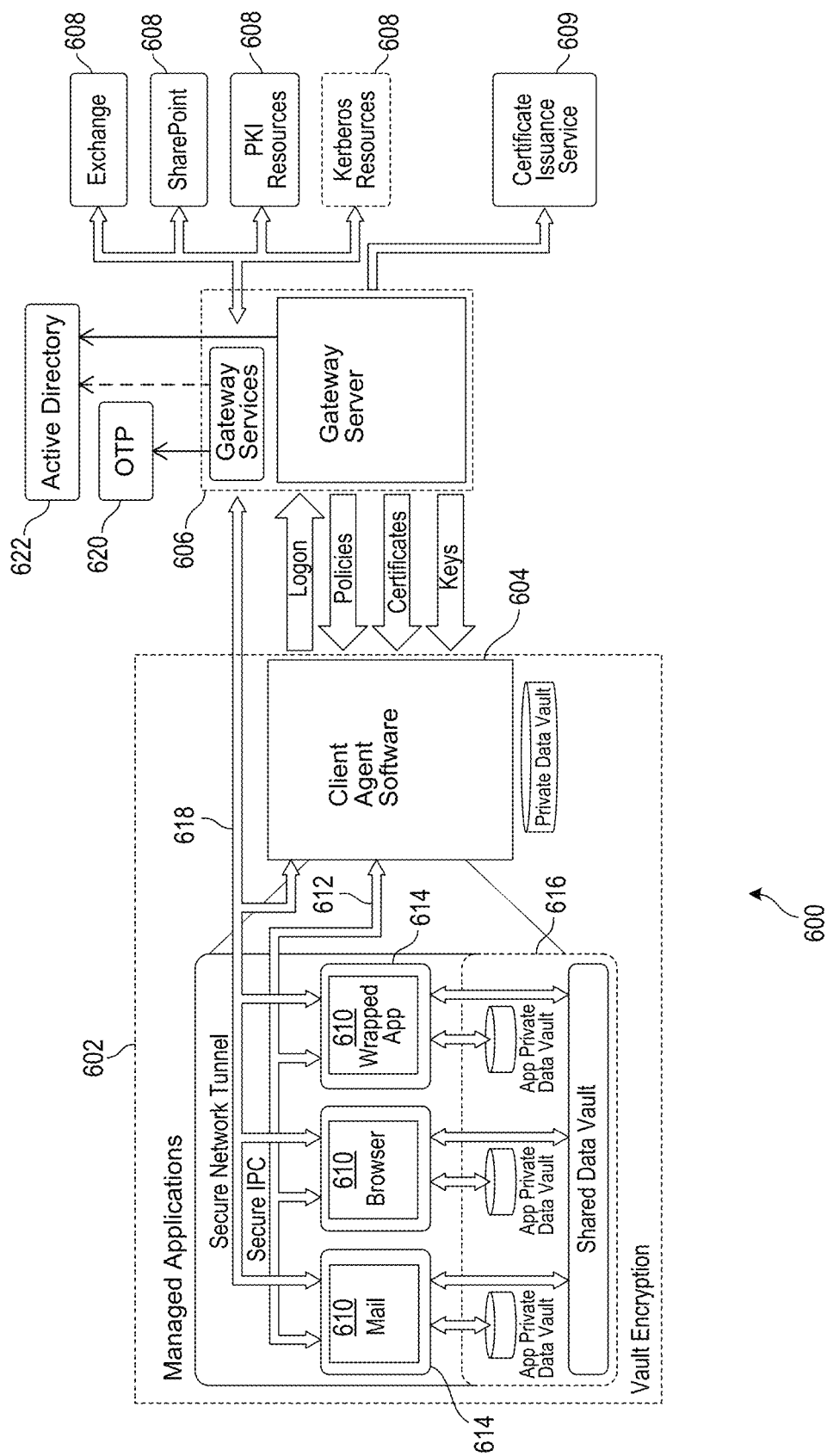
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the mobile device 602. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) 606 with SSO to other gateway server components. The client agent 604 obtains policies from gateway server 606 to control the behavior of the managed applications 610 on the mobile device 602.

The Secure InterProcess Communication (IPC) links 612 between the native applications 610 and client agent 604 represent a management channel, which may allow a client agent to supply policies to be enforced by the application management framework 614 "wrapping" each application. The IPC channel 612 may also allow client agent 604 to supply credential and authentication information that enables connectivity and SSO to enterprise resources 608. Finally, the IPC channel 612 may allow the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 may request policy information from client agent 604, which in turn may request it from gateway server 606. The application management framework 614 may request authentication, and client agent 604 may log into the gateway services part of gateway server 606 (for example, Citrix Gateway). Client agent 604 may also call supporting services on gateway server 606, which may produce input material to derive encryption keys for the local data vaults 616, or may provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel 612 and obtain the policy for that application. The application management framework 614 may enforce relevant portions of the policy that apply locally, such as the client agent login dependencies and some of the containment policies that restrict how local OS services may be used, or how they may interact with the managed application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 may be responsible for orchestrating the network access on behalf of each managed application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application 610 may use a special background network access mechanism that allows it to access an Exchange server 608 over an extended period of time without requiring a full AG logon. The Browser application 610 may use multiple private data vaults 616 to segregate different kinds of data.

This architecture may support the incorporation of various other security features. For example, gateway server 606 (including its gateway services) in some cases may not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. If or when data is stored locally on the mobile device 602 in the secure container 616, it may be preferred that a minimum of AES 256 encryption algorithm be utilized.

Other secure container features may also be implemented. For example, a logging feature may be included, wherein security events happening inside a managed application 610 may be logged and reported to the backend. Data wiping may be supported, such as if or when the managed application 610 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the mobile device 602 is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, if or when a managed application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text may be sent to the user with an OTP 620. In some cases, this may be implemented only for online use, with a prompt being a single field.

An offline password may be implemented for offline authentication for those managed applications 610 for which offline use is permitted via enterprise policy. For example, an enterprise may want StoreFront to be accessed in this manner In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature may relate to the enablement of a client side certificate for certain applications 610 as secondary credentials (for the purpose of accessing PKI protected web resources via the application management framework micro VPN feature). For example, a managed application 610 may utilize such a certificate. In this case, certificate-based authentication using ActiveSync protocol may be supported, wherein a certificate from the client agent 604 may be retrieved by gateway server 606 and used in a keychain. Each managed application 610 may have one associated client certificate, identified by a label that is defined in gateway server 606.

Gateway server 606 may interact with an enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications 610, and ultimately by arbitrary wrapped applications 610 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application 610 for each period of use. Application management framework client certificate support may use a HTTPS implementation with private in-memory key storage. The client certificate may not be present in the iOS keychain and may not be persisted except potentially in "online-only" data value that is strongly protected.

Mutual SSL or TLS may also be implemented to provide additional security by requiring that a mobile device 602 is authenticated to the enterprise, and vice versa. Virtual smart cards for authentication to gateway server 606 may also be implemented.

Another feature may relate to application container locking and wiping, which may automatically occur upon jailbreak or rooting detections, and occur as a pushed command from administration console, and may include a remote wipe functionality even when a managed application 610 is not running.

A multi-site architecture or configuration of enterprise application store and an application controller may be supported that allows users to be serviced from one of several different locations in case of failure.

In some cases, managed applications 610 may be allowed to access a certificate and private key via an API (for example, OpenSSL). Trusted managed applications 610 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g. transaction log) or for temporary data encryption.

Native Application Integration for Enhanced Remote Desktop Experiences

Figure 7A:
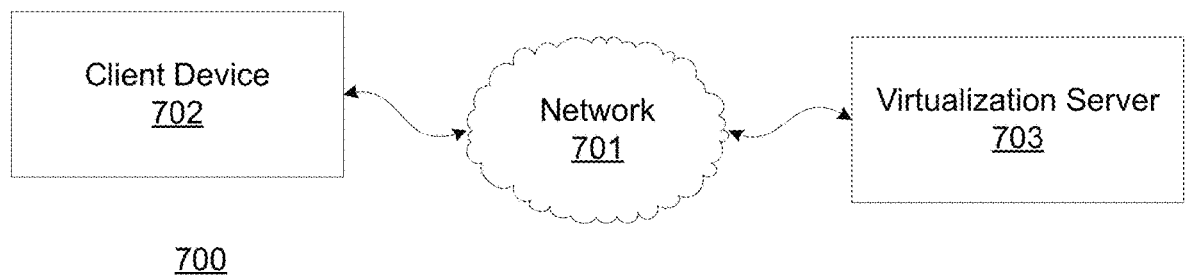
FIGS. 7A and 7B depict an illustrative computing environment for enhancing remote desktop experiences using native applications in accordance with one or more example embodiments.
Figure 7B:
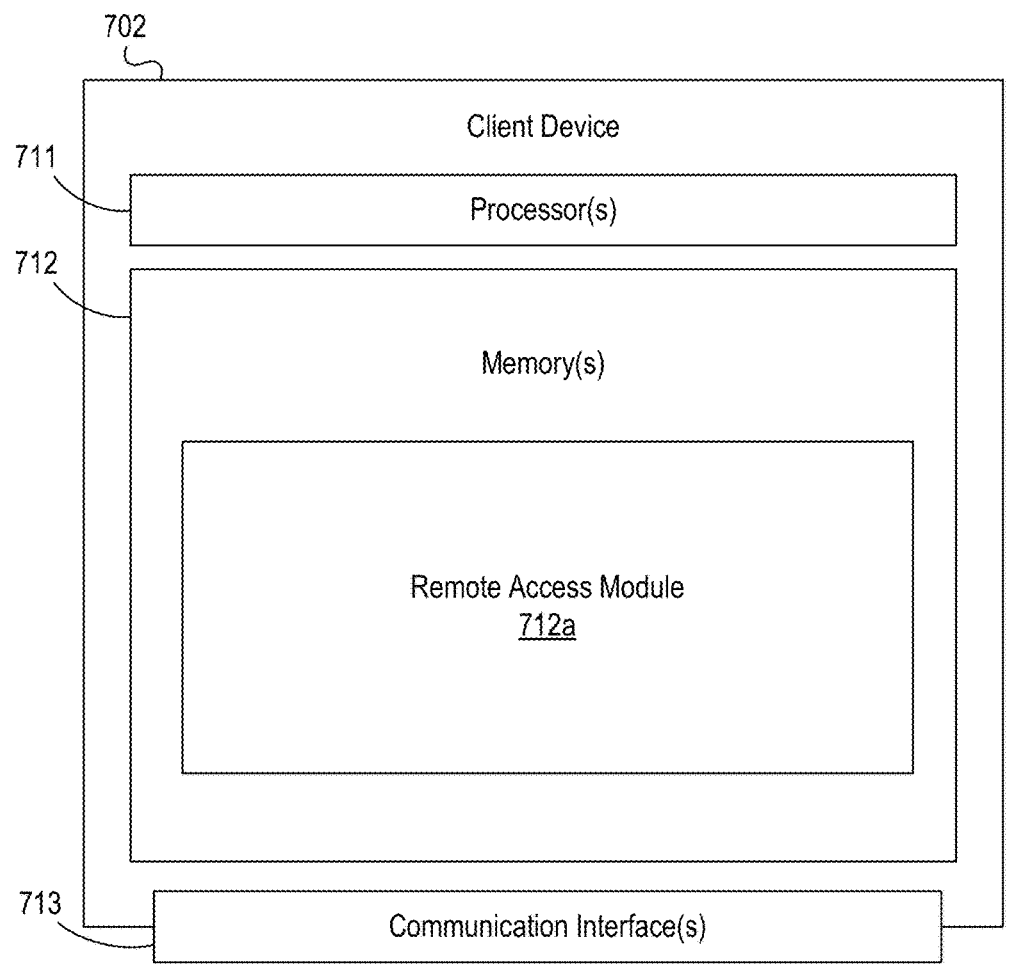

FIGS. 7A and 7B depict an illustrative computing environment for enhancing remote desktop experiences using native applications in accordance with one or more example embodiments. Referring to FIG. 7A, computing environment 700 may include one or more computer systems. For example, computing environment 700 may include a client device 702 and a virtualization server 703.

As illustrated in greater detail below, client device 702 (which may, e.g., be a computing device similar to devices 107 or 109, shown in FIG. 1, or client machine 240, shown in FIG. 2) may include one or more computing devices configured to perform one or more of the functions described herein. For example, client device 702 may be a mobile device, a tablet, a smart phone, laptop computer, desktop computer, or the like. In some instances, the client device 702 may be configured to establish a remote desktop session (e.g., with the virtualization server 703) and may support one or more native applications (e.g., word processors, video/audio players, PDF viewers, and/or other applications).

As illustrated in greater detail below, virtualization server 703 may be a computer system that includes one or more computing devices and/or other computer components (e.g., processors, memories, communication interfaces, servers, server blades, or the like). In addition, virtualization server 703 may be configured to host one or more remote desktops, and may support integration of native applications (e.g., from the client device 702) with these remote desktops. In some instances, virtualization server 703 may be similar to virtualization server 301, which is shown in FIG. 3.

Computing environment 700 may also include one or more networks, which may interconnect client device 702 and virtualization server 703. For example, computing environment 700 may include a network 701 (which may e.g., interconnect client device 702 and virtualization server 703). In some instances, the network 701 may be similar to computer network 230, which is shown in FIG. 2.

In one or more arrangements, client device 702, virtualization server 703, and/or the other systems included in computing environment 700 may be any type of computing device capable of receiving a user interface, receiving input via the user interface, and communicating the received input to one or more other computing devices. For example, client device 702, virtualization server 703, and/or the other systems included in computing environment 700 may in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of client device 702 and/or virtualization server 703 may, in some instances, be special purpose computing devices configured to perform specific functions.

Referring to FIG. 7B, client device 702 may include one or more processors 711, memory 712, and communication interface 713. A data bus may interconnect processor 711, memory 712, and communication interface 713. Communication interface 713 may be a network interface configured to support communication between the client device 702 and one or more networks (e.g., network 701, or the like). Memory 712 may include one or more program modules having instructions that when executed by processor 711 cause client device 702 to perform one or more functions described herein and/or access one or more databases that may store and/or otherwise maintain information which may be used by such program modules and/or processor 711. In some instances, the one or more program modules and/or databases may be stored by and/or maintained in different memory units of client device 702. For example, memory 712 may have, host, store, and/or include a remote access module 712a. Remote access module 712a may cause or otherwise enable the client device 702 to establish a remote desktop session (e.g., with virtualization server 703), as described in greater detail below.

Figure 8A:
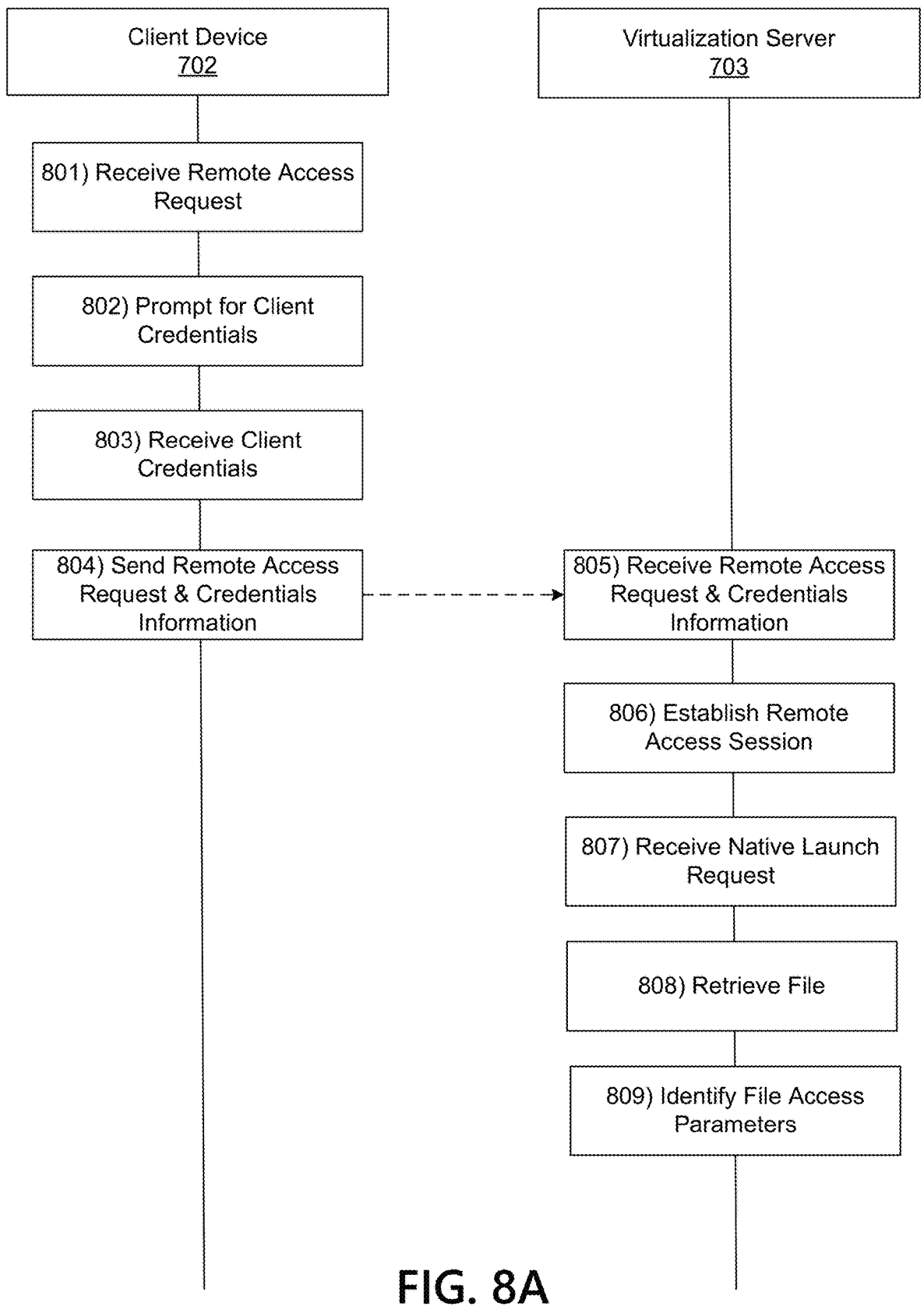
FIGS. 8A and 8B depict an illustrative event sequence for enhancing remote desktop experiences using native applications in accordance with one or more example embodiments.
Figure 8B:
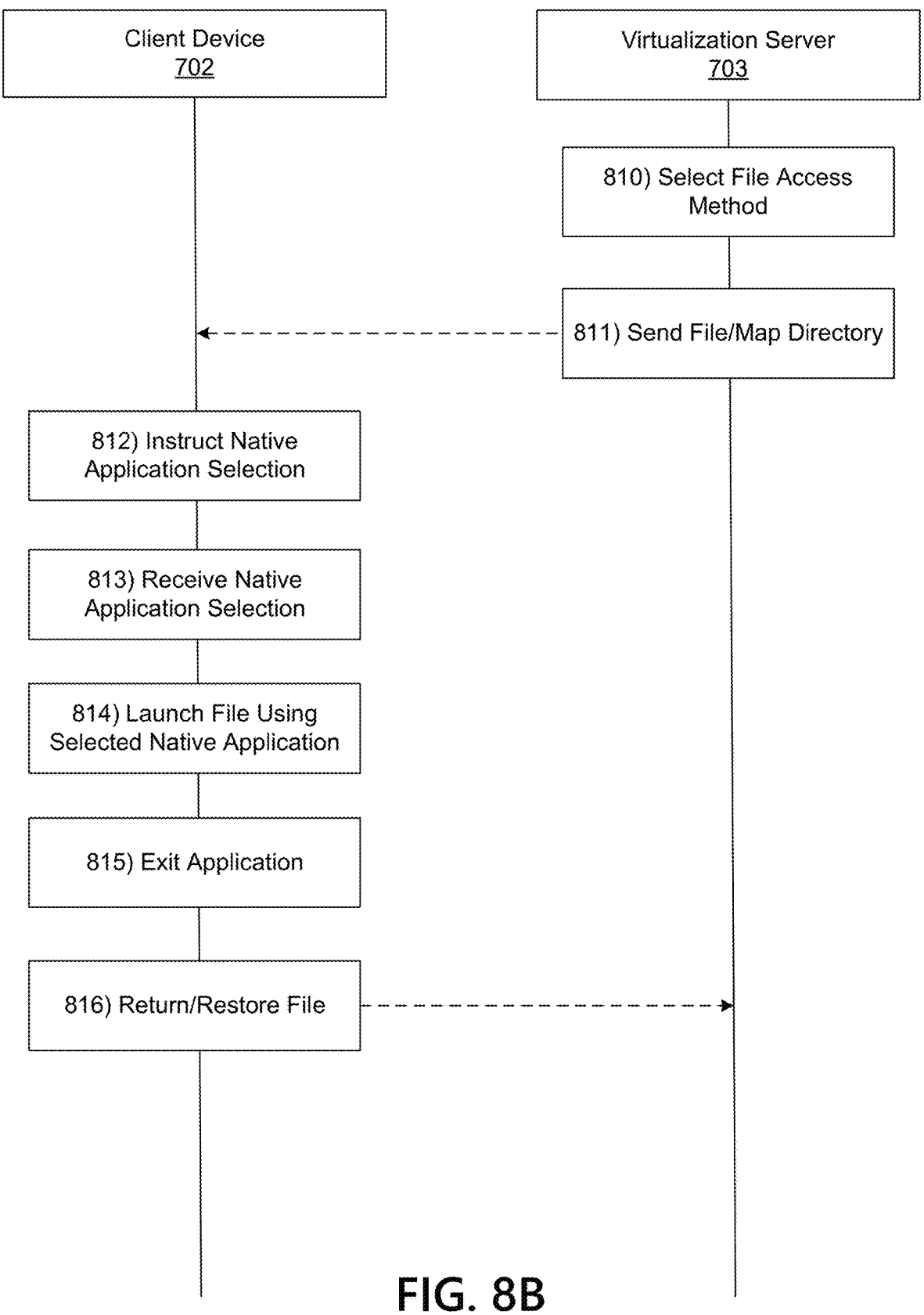

FIGS. 8A and 8B depict an illustrative event sequence for enhancing remote desktop experiences using native applications in accordance with one or more example embodiments. It should be understood that steps 801-817 may, in some instances, occur in the order as shown with regard to FIGS. 8A and 8B. For example, after completing step 810 of FIG. 8A, the event sequence may proceed to step 811 of FIG. 8B.

Referring to FIG. 8A, at step 801, a client application (e.g., a client agent or remote access module) may receive a request to establish a remote access session (e.g., via a display of the client device 702). For example, the client device 702 may be located on a network, different than an enterprise network corresponding to the virtualization server 703, and thus a request may be received to establish a remote session within the enterprise network. In one or more instances, the client device 702 may receive the request to establish a remote access session by receiving a user input via a display of the client device 702 or another input mechanism corresponding to the client device 702 (keyboard input, mouse input, or the like).

At step 802, after receiving the request to establish a remote access session received at step 801, the client device 702 may prompt a user to input credentials. For example, the client device 702 may prompt the user to provide authentication information verifying that he or she is permitted to access the enterprise network. In some instances, in prompting for the credentials, the client device 702 may prompt for a username, password, authentication key, and/or other authentication information (which may, in some instances, include multifactor authentication). In some instances, these credentials may be used by the virtualization server 703 to authenticate the user.

At step 803, the client device 702 may receive the credentials requested at step 802. At step 804, the client device 702 may send a remote access request, along with the credentials received at step 803, to the virtualization server 703. In some instances, the client device 702 may send security information indicating device integrity corresponding to the client device 702. For example, in some instances, the client device 702 may generate a numeric identifier and/or other indication of an integrity level of the client device 702 (e.g., based on whether or not the client device 702 is rooted, or other security information), and may send this information to the virtualization server 703 (which may, e.g., inform the virtualization server 703 of how secure the client device 702 is). In some instances, the client device 702 may send the security information at a later time once the remote access session is established.

At step 805, the virtualization server 703 may receive the remote access request, credentials, and/or security information from the client device 702. The virtualization server 703 may attempt to validate the received credentials. If the virtualization server 703 validates the received credentials, the virtualization server 703 may proceed to step 806. If the virtualization server 703 is determines that the received credentials are invalid, the virtualization server 703 may send a notification to the client device 702 for display, indicating that the received credentials were not authenticated and requesting updated credentials.

At step 806, based on or in response to authenticating the credentials at step 805, the virtualization server 703 may establish a remote access session with the client device 702. For example, the client device 702 may allow the client device 702 to operate on the enterprise network from a remote location.

Figure 11:
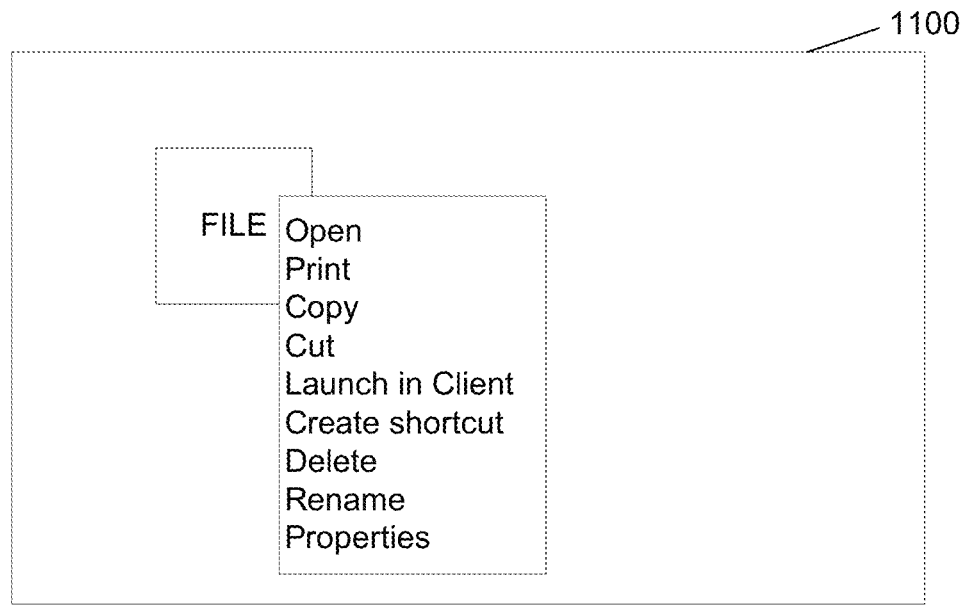
FIGS. 11 and 12 depict illustrative user interfaces for enhancing remote desktop experiences using native applications in accordance with one or more example embodiments.

At step 807, while the remote access session is established with the virtualization server 703, the virtualization server 703 may receive a request to launch a file using a native application. In receiving the request to launch the file, the virtualization server 703 may receive a request to launch a document, a PDF, an audio or video file, a slideshow presentation, a spreadsheet, an image, a compressed file, and/or other file types. In some instances, the virtualization server 703 may receive this request based on an input received at the client device 702. For example, the client device 702 may display, within the remote access session, a graphical user interface, similar to graphical user interface 1100, which is shown in FIG. 11. For example, the client device 702 may display an icon corresponding to the file, within the remote access session. In this example, the client device 702 may receive, within the client application and while the remote access session is established, a user input (e.g., a right click, or other user input) corresponding to the file, which may open, within the remote access session, a menu of actions that may be performed with regard to the file. As shown on graphical user interface 1100, one of the options displayed, during the remote access session, by the client device 702 may be "Launch in Client." In some instances, the remote desktop server 702 may receive a user input selecting that the file be launched in the client, which may initiate launch of the file using a native application. In these instances, the user input may be received within the client application running on the client device 702, and interpreted by the virtualization server 703 (e.g., rather than at the client device 702) due to the established remote desktop session.

At step 808, the remote desktop server 702 may retrieve the file (e.g., the file for which native launch was requested at step 807). At step 809, the remote desktop server 703 may identify file access parameters for the file. For example, based on the credentials received at step 805, the virtualization server 703 may identify the user, and may identify corresponding permissions for the user. For example, the user may correspond to a particular seniority level, department, role, and/or other sub-group within the enterprise that may cause the user to have permissions to edit or otherwise manipulate certain files. The virtualization server 703 may identify permissions for the user based on these credentials, and may compare the permissions to the requested file (e.g., to identify whether or not the user is authorized to edit the requested file). If the virtualization server 703 identifies that the user is authorized to edit the requested file, the virtualization server 703 may identify that the file may be accessed at the client device 702 in an editable format. If the virtualization server 703 identifies that the user is not authorized to edit the requested file, the virtualization server 703 may identify that the file may be accessed at the client device 702 in "locked for editing" state, which may enable the user to view, but not otherwise edit, the file.

Additionally or alternatively, the virtualization server 703 may identify file access parameters based on security information corresponding to the file. For example, if the file is sensitive and/or proprietary to an enterprise organization, the virtualization server 703 may identify that the file may be accessed at the client device 702 in the "locked for editing" state (whereas the virtualization server 703 may otherwise identify that the file may be accessed at the client device 702 in an editable format).

Referring to FIG. 8B, at step 810, the virtualization server 703 may select a file access method. For example, based on the security information received at step 805, the virtualization server 703 may identify whether the requested file should be sent to the client device 702 or a file directory for the virtualization server 703, at which the file is stored, should be mapped to the client device 702. For example, the virtualization server 703 may compare the numeric identifier indicating integrity and/or security of the client device 702 with a security threshold (and/or otherwise evaluate the security information). In this example, if the virtualization server 703 identifies that the security threshold is met or exceeded (and thus that the client device 702 has sufficient device integrity to receive the file), the virtualization server 703 may identify that the file may be sent to the client device 702 for access. If the virtualization server 703 identifies that the security threshold is not met, the virtualization server 703 may identify that the file should not be sent to the client device 702, but rather that a file directory corresponding to the file should be rewritten to the client device 702 (which may e.g., allow the client device 702 to access the file from the directory). In doing so, the virtualization server 703 may secure the file (e.g., based on integrity of the client device 702), while still allowing the client device 702 to access the file using a native application while the remote access session is established as described further below.

At step 811, based on the file access method selected at step 811 (e.g., send file or rewrite file directory), the virtualization server 703 may send the file to the client device 702 or map a remote desktop drive (e.g., present in the remote access session) to the client device 702. For example, the virtualization server 703 may send a file directory (e.g. a URL) to the client device 702, at which the file may be accessed. In this example, once the directory is received at the client device 702, the file may be downloaded to the client device 702. For example, the internal client application storage (within the remote desktop session) may be exposed to the virtualization server 703, and thus a network drive for the virtualization server 703 may be sent to the client application.

In other instances, where the virtualization server 703 identifies that the file should be sent to the client device 702, the virtualization server 703 may identify, based on the file access parameters determined at step 809, whether the file should be sent in a "locked for editing" state or in an editable state.

At step 812, based on receipt of the file or the file directory at step 811, the client device 702 may identify a native application that may be used to launch the file at the client device 702. In some instances, the client device 702 may identify, based on a file type corresponding to the file, one or more native applications configured to launch the file. In some instances, the client device 702 may identify a single native application configured to launch the file. In these instances, the client device 702 may proceed to step 814. In other instances, the client device 702 may identify multiple native applications configured to launch the file. In these instances, the client device 702 may proceed to step 813.

Figure 12:
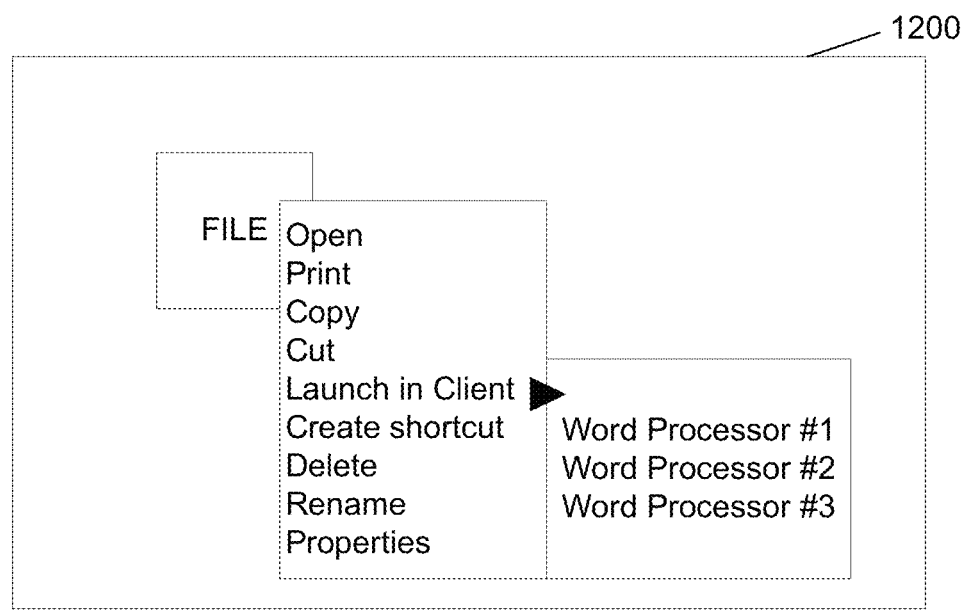

At step 813, the client device 702 may prompt the user to select one of the multiple identified native applications. For example, the client device 702 may display a graphical user interface similar to graphical user interface 1200, which is shown in FIG. 12. For example, the client device 702 may display a menu that includes the multiple identified native applications, and prompts for a user selection of an application. In these instances, once the client device 702 receives a selection of a native application, the client device 702 may proceed to step 814.

At step 814, the client device 702 may launch the file using the native application that was either automatically selected at step 812 or selected by the user at step 813. For example, the client device 702 may launch the file using the native application while the remote access session is established. In some instances (e.g., instances during which the file is available for editing by the user), the user may edit the file using the native application. In some instances, in launching the file, the client device 702 may launch the file within a secure sandbox at the client device 702 to prevent access by other unauthorized individuals (e.g., by preventing transfer of the file to other devices, accounts, or the like). In doing so, the client device 702 may permit the use of native applications/local file operations to access the file without compromising security features of the remote desktop. In instances where the file is sent to the client device 702, the client device 702 may allow a copy of the file to be edited (assuming that the file is not launched in a read only mode) at the client device 702 itself, rather than at the virtualization server 703. In instances where a directory is sent to the client device 702, the native application may use the directory to open the file. For example, underlying processes of the client application may recognize the directory as a network mapped drive, and may communicate directly with the virtualization server 703 to access the file without storing the file at the client device 702 (e.g., the file may simply remain in memory of the client device 702 while being accessed through the native application).

At step 815, the client device 702 may exit the application used to natively launch the file (e.g., in response to a user input requesting the file be closed). At step 816, the client device 702 may cause the file to be returned to the virtualization server 703, and may delete the file from the client device 702 (e.g., in instances where the actual file was sent to the client device 702). In other instances, (e.g., instances where a directory was sent to the client device 702), the file may be automatically copied by the client application back to the virtualization server 703 once the native application is exited (e.g., because the client application may recognize that the directory was a mapped network drive). For example, the client device 702 may select one of these approaches to take based the file access method selected at step 810. In either approach, the client device 702 may save any edits or changes made to the file prior to sending/storing the file. Once the file has been exited, the client device 702 may continue to operate within the remote access session established with the virtualization server 703. Accordingly, the method described above may permit a user to access files during a remote desktop session using a native application (e.g., rather than limiting the user to applications integrated into the remote desktop), which may provide an improved client experience.

Figure 9:
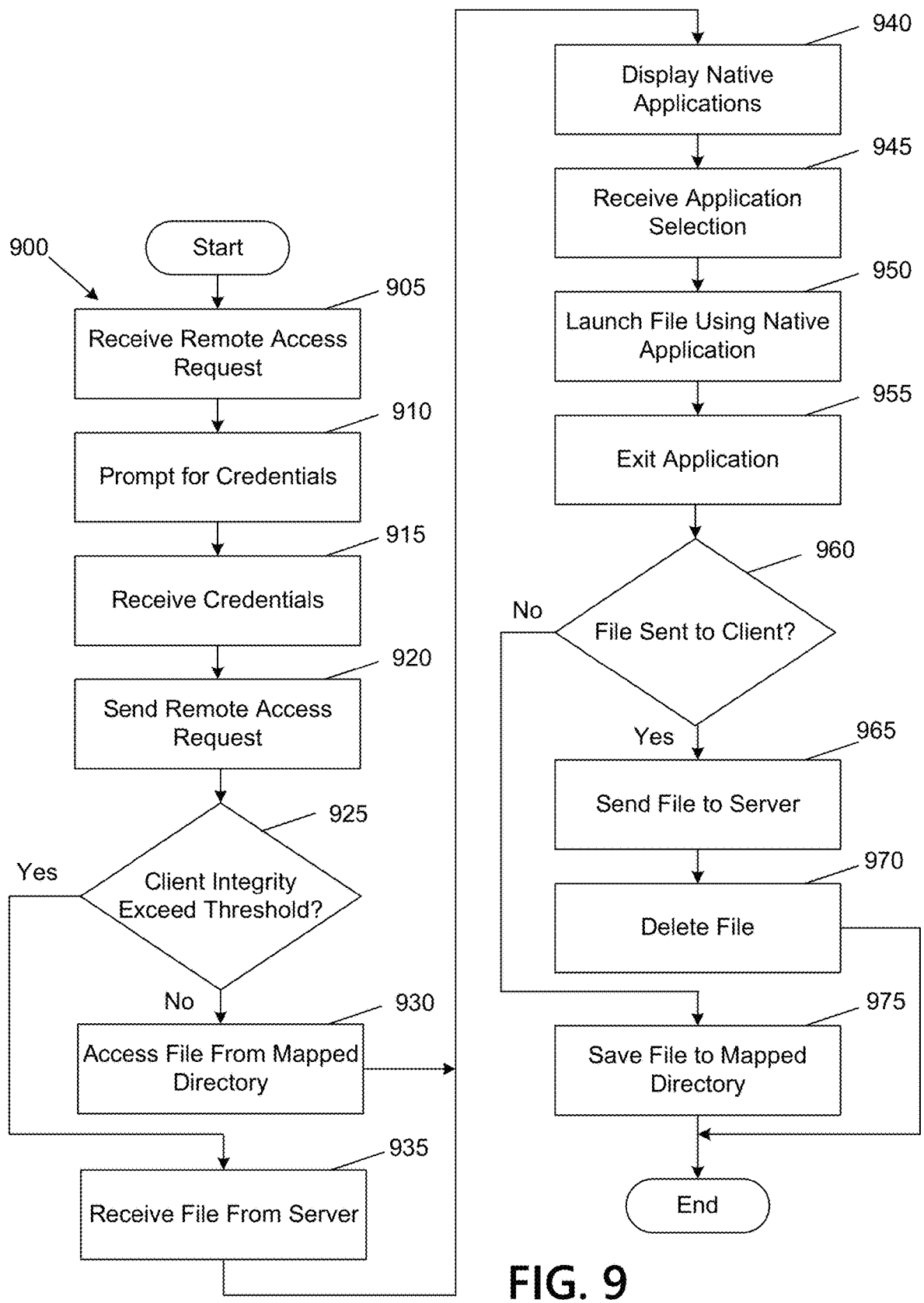
FIGS. 9 and 10 depict illustrative methods for enhancing remote desktop experiences using native applications in accordance with one or more example embodiments.

FIG. 9 depicts an illustrative method 900 for enhancing remote desktop experiences using native applications in accordance with one or more example embodiments. Referring to FIG. 9, at step 905, a computing device having at least one processor, a communication interface, and memory may receive a request to establish a remote access session. At step 910, the computing device may prompt a user for credentials to establish the remote access session. At step 915, the computing device may receive the credentials. At step 920, the computing device may send a request to establish the remote access session to a remote desktop server. At step 925, the computing device may identify whether integrity of the computing device exceeds a predetermined threshold. If the computing device does exceed the predetermined threshold, the computing device may proceed to step 935. If the computing device does not exceed the predetermined threshold, the computing device may proceed to step 930.

At step 930, the computing device may access the requested file from a directory mapped to the computing device. At step 935, the computing device may receive the requested file from the remote desktop server. At step 940, the computing device may display native applications configured to open the file. At step 945, the computing device may receive selection of an application. At step 950, the computing device may launch the file using the selected native application. At step 955, the computing device may exit the file. At step 960, the computing device may identify whether or not the file was sent to the computing device. If the file was sent to the computing device, the computing device may proceed to step 965. If the file was not sent to the computing device, the computing device may proceed to step 975.

At step 965, the computing device may send the file to the remote desktop server. At step 970, the computing device may delete the file from the computing device. At step 975, the computing device may save the file to a directory mapped to the remote desktop server.

Figure 10:
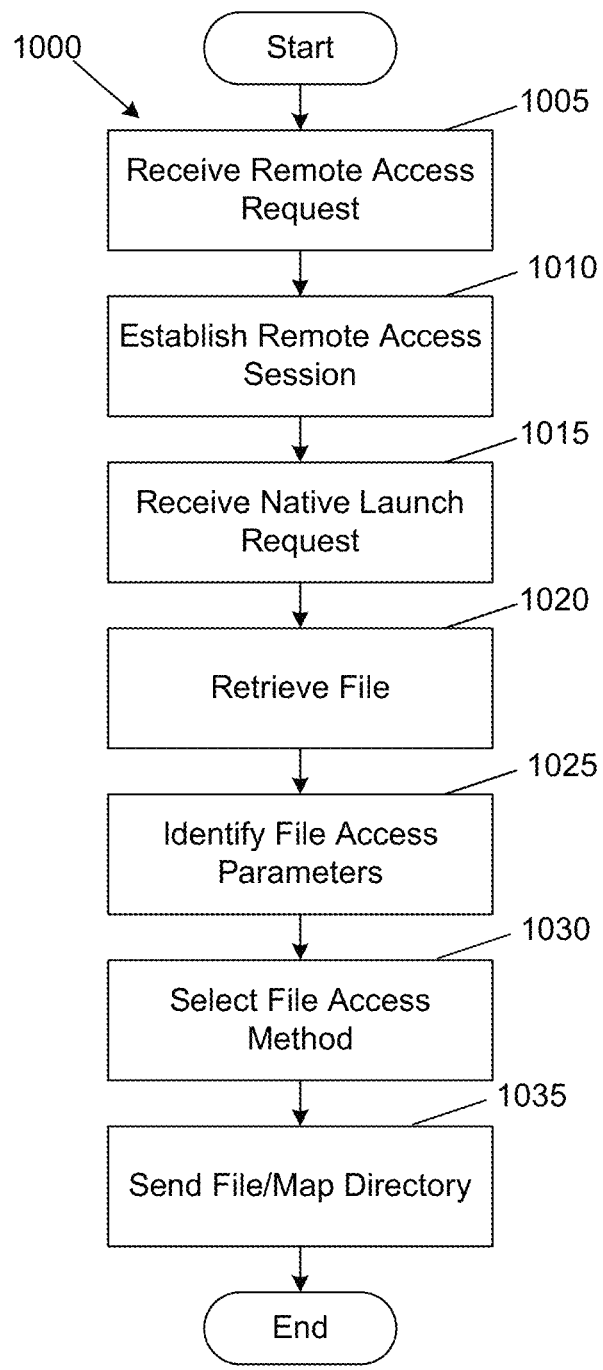

FIG. 10 depicts an illustrative method 1000 for enhancing remote desktop experiences using native applications in accordance with one or more example embodiments. While FIG. 9 depicts this illustrative method from the client device perspective, FIG. 10 depicts the illustrative method from the server side perspective. Referring to FIG. 10, at step 1005, a computing device having at least one processor, a communication interface, and memory may receive a request to establish a remote access session with a client device. At step 1010, the computing device may establish the remote access session. At step 1015, the computing device may receive a request to launch a file using a native application. At step 1020, the computing device may retrieve the file. At step 1025, the computing device may identify file access parameters. At step 1030, the computing device may select a file access method based on integrity of the client device, and may grant the client device access to the file (e.g., send the file or map a file directory to the client device). At step 1035, the computing device may send the file or map a file directory to the computing device to allow native launch of the file by the computing device.

The following paragraphs (M1) through (M9) describe examples of methods that may be implemented in accordance with the present disclosure.

(M1) A method comprising at a computing device comprising at least one processor, a communication interface, and memory: launching a remote desktop session; receiving, during the remote desktop session, user input requesting a file to be launched at the computing device using a local application; sending, to a remote desktop server, a request to access the file; and launching, using a local application, the file.

(M2) A method may be performed as described in paragraph (M1) wherein the remote desktop session is launched based on verification of client credentials.

(M3) A method may be performed as described in paragraph (M1) further comprising sending, along with a request to establish the remote desktop session, client security information indicating one or more security parameters corresponding to the computing device, wherein the remote desktop server is configured to select an access method for the file based on the client security information.

(M4) A method may be performed as described in paragraph (M3), wherein the access method comprises one of: receiving, by the computing device and from the remote desktop server, the file, or mapping, by the remote desktop server and to the computing device, a directory corresponding to the file.

(M5) A method may be performed as described in paragraph (M3), further comprising: receiving edits to the file; selecting, based on the access method, a file save method; saving, using the file save method, the edits to the file; and exiting, after saving the edits to the file, the file.

(M6) A method may be performed as described in paragraph (M5), wherein the file save method comprises one of: sending, to the remote desktop server, the edited file, where the edited file is deleted from the computing device after being sent, or storing the edited file at a directory mapped to the remote desktop server.

(M7) A method may be performed as described in any of paragraphs (M1)-(M6), wherein the file is received, from the remote desktop server, and wherein launching the file comprises launching the received file within a secure sandbox at the computing device.

(M8) A method may be performed as described in any of paragraphs (M1)-(M7), wherein launching the file comprises accessing a file directory, corresponding to the file, mapped to the computing device.

(M9) A method may be performed as described in any of paragraphs (M1)-(M8), wherein: the remote desktop server is configured to identify access parameters for the file, and the access parameters indicate one of: the file may be edited at the computing device, or the file may be locked for editing at the computing device.

The following paragraphs (A1) through (A11) describe examples of apparatuses that may be implemented in accordance with the present disclosure.

(A1) A computing device comprising at least one processor; memory storing computer-readable instructions that, when executed by the at least one processor, cause the computing device to: launch a remote desktop session; receive, during the remote desktop session, user input requesting a file to be launched at the computing device using a local application; receive, from a remote desktop server, the file; and launch, using a local application, the file.

(A2) The computing device of paragraph (A1), wherein the remote desktop session is launched based on verification of client credentials.

(A3) The computing device of any one of paragraphs (A1)-(A2), wherein the memory stores additional computer-readable instructions that, when executed by the at least one processor, further cause the computing device to: send, along with a request to establish the remote desktop session, client security information indicating one or more security parameters corresponding to the computing device, wherein the remote desktop server is configured to select an access method for the file based on the client security information.

(A4) The computing device of paragraph (A3), wherein the access method comprises one of: receiving, by the computing device and from the remote desktop server, the file, or mapping, by the remote desktop server and to the computing device, a directory corresponding to the file.

(A5) The computing device of paragraph (A3), wherein the memory stores additional computer-readable instructions that, when executed by the at least one processor, further cause the computing device to: receive edits to the file; select, based on the access method, a file save method; save, using the file save method, the edits to the file; and exit, after saving the edits to the file, the file.

(A6) The computing device of paragraph (A5), wherein the file save method comprises one of: sending, to the remote desktop server, the edited file, wherein the edited file is deleted from the computing device after being sent, or storing the edited file at a directory mapped to the remote desktop server.

(A7) The computing device of any one of paragraphs (A1)-(A6), wherein the file is received, from the remote desktop server, and wherein launching the file comprises launching the received file within a secure sandbox at the computing device.

(A8) The computing device of any one of paragraphs (A1)-(A7), wherein launching the file comprises accessing a file directory, corresponding to the file, mapped to the computing device.

(A9) The computing device of any one of paragraphs (A1)-(A8), wherein: the remote desktop server is configured to identify access parameters for the file, and the access parameters indicate one of: the file may be edited at the computing device, or the file may be locked for editing at the computing device.

(A10) The computing device of any one of paragraphs (A1)-(A9), wherein the memory stores additional computer-readable instructions that, when executed by the at least one processor, further cause the computing device to: identify local applications configured to launch the file; and prompt for a user selection of one of the identified local applications.

(A11) A computing device, comprising: at least one processor; memory storing computer-readable instructions that, when executed by the at least one processor, cause the computing device to: establish a remote desktop session; receive, during the remote desktop session, a request for a file to be launched at a client device using a local application; retrieve the file; send, to the client device, the file, wherein sending the file causes the client device to launch a local application configured to access the file.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A computing device, comprising:
   at least one processor;
   memory storing computer-readable instructions that, when executed by the at least one processor, cause the computing device to:
   send, along with a request to establish a remote desktop session, client security information indicating one or more security parameters corresponding to the computing device;
   launch the remote desktop session;
   receive, during the remote desktop session, user input requesting a file to be launched at the computing device using a local application installed on the computing device;
   receive, from a remote desktop server, the file; and
   launch, using the local application, the file,
   wherein the remote desktop server is configured to select an access method for the file based on the client security information.

2. The computing device of claim 1, wherein the remote desktop session is launched based on verification of client credentials.

3. The computing device of claim 1, wherein the access method comprises one of:
   receiving, by the computing device and from the remote desktop server, the file, or
   mapping, by the remote desktop server and to the computing device, a directory corresponding to the file.

4. The computing device of claim 1, wherein the memory stores additional computer-readable instructions that, when executed by the at least one processor, further cause the computing device to:
   receive edits to the file;
   select, based on the access method, a file save method, wherein the file save method comprises:
      returning the file to the remote desktop server, and
      deleting the file from the computing device;
   save, using the file save method, the edits to the file; and
   exit, after saving the edits to the file, the local application used to launch the file.

5. The computing device of claim 4, wherein the file save method comprises one of:

sending, to the remote desktop server, the edited file, wherein the edited file is deleted from the computing device after being sent, or storing the edited file at a directory mapped to the remote desktop server.

6. The computing device of claim 1, wherein the file is received, from the remote desktop server, and wherein launching the file comprises launching the received file within a secure sandbox at the computing device.

7. The computing device of claim 1, wherein launching the file comprises accessing a file directory, corresponding to the file, mapped to the computing device.

8. The computing device of claim 1, wherein:
the remote desktop server is configured to identify access parameters for the file, and
the access parameters indicate one of:
the file may be edited at the computing device, or
the file may be locked for editing at the computing device.

9. The computing device of claim 1, wherein the memory stores additional computer-readable instructions that, when executed by the at least one processor, further cause the computing device to:
identify local applications configured to launch the file; and
prompt for a user selection of one of the identified local applications.

10. A method comprising:
at a computing device comprising at least one processor, a communication interface, and memory:
sending, along with a request to establish a remote desktop session, client security information indicating one or more security parameters corresponding to the computing device;
launching the remote desktop session;
receiving, during the remote desktop session, user input requesting a file to be launched at the computing device using a local application installed on the computing device;
sending, to a remote desktop server, a request to access the file; and
launching, using the local application, the file,
wherein the remote desktop server is configured to select an access method for the file based on the client security information.

11. The method of claim 10, wherein the remote desktop session is launched based on verification of client credentials.

12. The method of claim 10, wherein the access method comprises one of:
receiving, by the computing device and from the remote desktop server, the file, or
mapping, by the remote desktop server and to the computing device, a directory corresponding to the file.

13. The method of claim 10, further comprising:
receiving edits to the file;
selecting, based on the access method, a file save method, wherein the file save method comprises:
returning the file to the remote desktop server, and deleting the file from the computing device;
saving, using the file save method, the edits to the file; and
exiting, after saving the edits to the file, the local application used to launch the file.

14. The method of claim 13, wherein the file save method comprises one of:
sending, to the remote desktop server, the edited file, wherein the edited file is deleted from the computing device after being sent, or
storing the edited file at a directory mapped to the remote desktop server.

15. The method of claim 10, wherein the file is received, from the remote desktop server, and wherein launching the file comprises launching the received file within a secure sandbox at the computing device.

16. The method of claim 10, wherein launching the file comprises accessing a file directory, corresponding to the file, mapped to the computing device.

17. The method of claim 10, wherein:
the remote desktop server is configured to identify access parameters for the file, and
the access parameters indicate one of:
the file may be edited at the computing device, or
the file may be locked for editing at the computing device.

18. A computing device, comprising:
at least one processor;
memory storing computer-readable instructions that, when executed by the at least one processor, cause the computing device to:
send, along with a request to establish a remote desktop session, client security information indicating one or more security parameters corresponding to a client device;
establish the remote desktop session;
receive, during the remote desktop session, a request for a file to be launched at the client device using a local application installed on the client device;
retrieve the file from a remote desktop server; and
send, to the client device, the file, wherein sending the file causes the client device to launch the local application installed on the client device and configured to access the file,
wherein the remote desktop server is configured to select an access method for the file based on the client security information.

* * * * *